United States Patent [19]
Tortosa

[11] Patent Number: 5,817,235
[45] Date of Patent: Oct. 6, 1998

[54] ANTI-TELESCOPING DEVICE FOR SPIRAL WOUND MEMBRANE MODULES

[76] Inventor: Pedro J. Tortosa, 1431 Co. Rd. V., Houlton, Wis. 54082

[21] Appl. No.: 694,125

[22] Filed: Aug. 8, 1996

Related U.S. Application Data

[60] Provisional application No. 60/002,154 Aug. 11, 1995.
[51] Int. Cl.$^6$ .............................. B01D 61/20; B01D 63/06
[52] U.S. Cl. ............... 210/232; 210/321.74; 210/321.83; 210/541; 285/95
[58] Field of Search ............................... 210/232, 321.74, 210/321.83, 497.1, 541; 426/491; 285/95

[56] References Cited

U.S. PATENT DOCUMENTS

| | | |
|---|---|---|
| 3,367,505 | 2/1968 | Bray . |
| 3,880,755 | 4/1975 | Thomas et al. ........................ 210/232 |
| 3,899,596 | 8/1975 | Stenne . |
| 3,914,435 | 10/1975 | Maubois et al. . |
| 3,928,204 | 12/1975 | Thomas ................. 210/232 |
| 4,001,198 | 1/1977 | Thomas ................. 426/491 |
| 4,033,878 | 7/1977 | Foreman et al. . |
| 4,205,090 | 5/1980 | Maubois et al. . |
| 4,237,010 | 12/1980 | Zimmerly ................................ 210/232 |
| 4,244,971 | 1/1981 | Wargel et al. . |
| 4,296,951 | 10/1981 | Zimmerly ................................ 285/95 |
| 4,401,679 | 8/1983 | Rubin et al. . |
| 4,517,085 | 5/1985 | Driscoll et al. .................... 210/321.83 |
| 4,766,003 | 8/1988 | Skovhauge et al. . |
| 4,792,401 | 12/1988 | Truex et al. . |
| 5,356,639 | 10/1994 | Jameson et al. . |
| 5,356,640 | 10/1994 | Jameson et al. . |

*Primary Examiner*—Joseph W. Drodge
*Attorney, Agent, or Firm*—Peter J. Georges

[57] ABSTRACT

Longitudinal extension and consequent destruction of spirally wound membrane modules arranged in paired axial alignment within a pressure vessel of an ultrafiltration unit are prevented by a pair of end-cap anti-telescoping devices (ATD's) and a central ATD. The central ATD is an integral assembly of a perforated circular steel plate and a solid interconnector that is concentrically disposed at its hub section with tubular ends protruding on each side of the plate and having an outer peripheral groove for an o-ring near each end for sealingly engaging the ends of a pair of membrane modules. Longitudinal extension of the spirally wound membranes is prevented by a plurality of axially protruding lugs that are concentrically disposed on each side of the plate for engaging the proximal ends of the permeate tubes and by the flat, circular faces of the central ATD engaging the ends of the membranes. Each of a pair of end-cap ATD's is rigidly attached to a circular interconnector on one side, facing the distal end of one membrane module, and is rigidly attached on the other side to one end of a permeate outlet support tube that is rigidly attached at its other end to an end cap through which a permeate outlet port axially extends. The end cap is sealingly clamped onto the end of the pressure vessel within which the ultrafiltration process is conducted. Each end-cap ATD has a flat, circular face engaging the distal end of a membrane and a plurality of circularly disposed lugs engaging the distal end of a permeate tube.

7 Claims, 4 Drawing Sheets

ANTI-TELESCOPING DEVICE FOR SPIRAL WOUND MEMBRANE MODULES

This application is a continuation of provisional application U.S. patent application Ser. No. 60/002,154, filed on Aug. 11, 1995.

BACKGROUND OF THE INVENTION

1. Field of the Invention

This invention relates to spirally wound membrane modules and especially relates to devices for concentrically supporting the modules within the pressure vessels and more particularly relates to devices to prevent endwise expansion and destruction of the modules by unwinding thereof.

2. Review of the Prior Art

The use of ultrafiltration to concentrate the feedstream in cheese production is known in the cheese making art.

Ultrafiltration provides a means for increasing the yields of cheese making processes by eliminating whey protein loss. Where ultrafiltration is used typically, milk is contacted with a membrane which permits the passage of water, lactose, and some minerals, but prevents the passage of casein, the whey protein, butterfat, and some minerals. Appropriate adjustment to increased proportion of minerals and/or lactose in the resultant retentate as a result of ultrafiltration is generally achieved by diafiltration. The selective concentration of milk results in the formation of a retentate is coagulated which contains whey proteins. When the retentate is coagulated by acid or rennet, it forms a curd which contains the whey proteins. If this coagulum is then subject to syneresis some of the whey proteins are lost in the expressed whey.

If coagulation is effected using a preselected retentate composition that corresponds to the resultant cheese proportions, then whey protein loss may be avoided.

U.S. Pat. No. 3,899,596, granted Aug. 12, 1975, describes a process for the production of cheese which comprises treating milk by ultrafiltration to obtain a product having at least some of the protein constituents of the milk, renneting the liquid product after inoculation with suitable ferments, and introducing a batch of the renneted liquid into a vertical chamber in which it is left to coagulate. The coagulum is cut into slabs which provide the end product cheese.

U.S. Pat. No. 3,914,435, granted Oct. 21, 1975, describes cheese made from heat-treated milk and without conventional draining of whey by a process which involves ultrafiltering of the milk to produce a concentrate having essentially the composition of cheese produced by conventional whey draining processes. The process enables the milk, after ultrafiltration, to be heat-treated without making the milk more difficult to coagulate with rennet, which difficulty normally occurs when milk is heated to high temperatures.

Journal of Dairy Science, Vol. 61, No. 7, 1978 "Making Ricotta Cheese by Ultrafiltration" by J. L. Maubois and F. V. Kosikowski, discloses the principles of an ultrafiltration process employed in the production of Ricotta cheese.

U.S. Pat. No. 4,205,090 describes the concentration of whole or skim milk by ultrafiltration to about one fifth of its volume to give a product, sometimes called a "liquid precheese", which is then manufactured by conventional means to give cheese.

U.S. Pat. No. 4,244,971, granted Jun. 13, 1981, describes the manufacture of cheeses and process cheese, from ultrafiltered milk.

U.S. Pat. No. 4,401,679 describes a process for preparing cheese base by concentrating milk through ultrafiltration combined with diafiltration and evaporation, wherein the retentate from the ultrafiltration is inoculated with an acid culture before evaporation, and after evaporation acidification proceeds to completion after packing.

Further, cheese base material has been taught by evaporating moisture from retentate under turbulent conditions to provide a lower moisture condition. Such a process is described in an article by Ernstrom, et al., entitled "Cheese base for Processing.: A High-yield Produce from Whole Milk by Ultrafiltration," published in the *Journal of Dairy Science*, Volume 63, 223–234 (1980). The article teaches a process wherein whole milk of normal pH, or acidified to a pH of 5.7, is concentrated by ultrafiltration to about 40 percent of the original milk weight and diafiltered at constant volume until a desired ratio of lactose to buffer capacity is established. The retentate is then further concentrated by ultrafiltration to 20 percent of the original milk weight. The retentate is then inoculated with cheese starter and incubated to completely ferment the residual lactose, pH control being achieved by controlling the level of lactose from the diafiltration step of the process. The product is further concentrated in a swept-surface vacuum-pan evaporator or a Luwa evaporator.

U.S. Pat. No. 4,766,003, granted Aug. 23, 1988, discloses a method for production of acid and heat coagulated types of cheeses from a starting mixture of milk and/or whey which is pasteurized, cooled and ultrafiltrated to obtain a 20%–40% solid retentate from which cheese product is formed by heating the retentate to a temperature of about 50°–100° C. and then acidifying the heated retentate with a coagulant to a pH of about 5.5–6.1 under a pressure of about 0.5–2.50 bar to form a mixture, thereafter subjecting the mixture to a sudden pressure drop to about atmospheric pressure to form a non-homogeneous mixture of liquid and cheese grains. The mixture is cooled, packaged and the packaged product further cooled to a temperature of below about 15 C. to form the desired cheese product.

For recent art, relating to the use of ultrafiltration to obtain a concentrate having a solids content desired in the cheese product, reference can be made to related U.S. Pat. Nos. 5,356,639 and 5,356,640, both granted Oct. 18, 1994. In accordance with such process, cheese is produced by ultrafiltering and diafiltering milk to obtain a concentrate having a solids content desired in the cheese, increasing the ionic strength of the concentrate by adding a salt to prevent coagulation during fermenting, fermenting the concentrate without producing a coagulum, preheating the fermented concentrate and thus evaporating water from the concentrate to obtain cheese in which substantially all the casein and whey proteins in the milk starting material are preserved.

Membrane modules comprising spirally wound membranes and their construction are well known and are illustrated, for example, in U.S. Pat. Nos. 3,367,505, 4,033,878, and 4,792,401. Spiral wound membrane modules, particularly low pressure modules used for ultrafiltration, such as in the dairy field for the separation of whey, are subject to a cleaning operation after periods of use, generally by the use of chemical cleaning solutions, such as caustics, detergents, chlorine, or combinations thereof, and are thereafter rinsed with clean water.

Spiral wound membrane modules are undoubtedly the most widely used membrane configuration in present day sanitary applications. Such membrane modules are installed inside elongated pressure vessels containing from one to six membranes. The feed stream enters the vessel through its inlet port at one end of the vessel and exits through its outlet port at the opposite end. The linear speed is substantial, thereby posing a threat to the integrity of the membranes that, under such conditions, tend to "telescope" (increase in length by partial unwinding) and destroy the membranes.

To avoid this problem, the modules are installed in the vessel with Anti Telescoping Devices (ATD's) between the modules and at each end of the vessel. Currently, sanitary and non-sanitary (industrial type) ATD's are available in vessels of 4-inch and 6-inch diameters but not in vessels of 8-inch diameter. A sanitary type of ATD that can be used in vessels of 8-inch diameter for food and dairy applications is greatly needed.

ATD's of the prior art consist of a molded plastic device, generally shaped as a star with five to eight radii and with an integral circle connecting all the outer ends of these radii, very much like a wagon wheel. This device requires a permeate tube longer than the membrane module itself in order to allow the permeate tube to protrude approximately one inch on each end and to permit the ATD to slide over the permeate tube. This design leaves areas that are beyond free access by cleaning and sanitizing agents, so that this wagon-wheel design is not suitable for food and dairy applications.

In addition, passage of the liquid between the radii is at a relatively high flow rate because of the reduced contact surface between the radii and the membrane. This high flow rate exerts a relatively high pressure against the membrane that tends to mark permanently and eventually damage the end of the membrane.

The membranes of this prior art wagon-wheel device are connected together by means of interconnectors that insert each end thereof inside the permeate tube of the adjacent membrane module. ATD's and interconnectors are two separate parts. One or two O-rings on the interconnector end provide the required seal. O-rings, however, are the weakest point in the whole system.

SUMMARY OF THE INVENTION

It is an object of this invention to provide anti-telescoping devices (ATD's) that secure an efficient cleaning in place (CIP) and disinfecting by incorporating the current standards that govern sanitary equipment for food industry applications and accepted practices.

It is another object to provide ATD's that allow for permeate sampling from each individual membrane module in order to have easy leak detection.

It is a further object to minimize the number of o-rings in the interconnectors.

In accordance with these objects and the principles of this invention, the ATD's of this invention and the interconnectors are integral, both being made of stainless steel AISI 316 L. The interconnector part is short in order to place its single o-ring at its outer end and as close to the end of the permeate tube as feasible. The ends of the permeate tube rest against a plurality of supporting lugs that are integral with the ATD in its central recessed area. These lugs provide the vital resistance to longitudinal extension or telescoping that otherwise would destroy the membrane module.

The pressure vessel contains two membrane modules in axial alignment. The ATD's of this invention are consequently in two slightly different forms, consisting of a central ATD and a pair of end-cap ATD's. Each of these end cap ATD's is welded to one of the feed/concentrate inlet/outlet support tubes which is in turn welded to an end cap, thereby eliminating an o-ring on one side and providing a strong support for the attached ATD and this adjacent membrane module.

An ultrafiltration unit generally comprises:

(a) an elongated tubular vessel having a first open end and a second open end;

(b) means for closing the first and second open ends to form closed first and second ends;

(c) two membrane modules encased in the vessel and disposed in axial alignment, each module comprising a permeate tube, having a proximal end and a distal end, that is surrounded with a spiral membrane, the proximal ends of these membrane modules facing one another, and the distal ends being separated from one another;

(d) means for separating the proximal ends of each of the membrane modules from one another and preventing membrane telescoping at the proximal ends of the membrane modules;

(e) means for sealing the proximal and distal ends of each of the permeate tubes;

(f) means for preventing membrane telescoping at the distal ends of the tubular membrane modules;

(g) means for removing permeate from the distal end of each of these permeate tubes and out of the ultrafiltration unit;

(h) inlet means at or proximate the closed first end for introducing fluid to be treated in the ultrafiltration unit; and (i) outlet means at or proximate the closed second end for removing retentate from the ultrafiltration unit.

The means for preventing membrane telescoping at a distal end comprises:

(a) an end cap assembly, comprising:

(1) an end cap, having an outer face and an inner recess for an o-ring, that is disposed perpendicularly to the axis of the vessel and is rigidly and removably attached to one open end thereof, (2) a permeate outlet support tube that is concentrically and rigidly attached to the end cap, (3) an end ring that is rigidly attached to the same open end of the pressure vessel and has a peripherally disposed outer recess and an outwardly facing and radially disposed flat surface, (4) a clamp that forcefully connects the end cap to the end ring by engaging the outer face and the inner recess, and (5) an o-ring, within the inner recess, that sealingly engages the flat surface, thereby sealing the end of the vessel; and (b) an ATD assembly, comprising:

(1) a flat, circular plate having a plurality of holes therethrough that fits closely within the pressure vessel, is perpendicular to the axis, and comprises:

(a') a hub section surrounding a central hole, this hub section being rigidly attached to the permeate outlet support tube on one side of the plate and having a recessed central area facing the membrane module on the side of the plate facing the module, and (b') a plurality of axially protruding lugs within the central area that are concentrically disposed for engaging one distal end of the permeate tube, and (2) an interconnector that is concentrically disposed and rigidly attached to the hub section on the module side of the plate, this interconnector having an o-ring recess near the end thereof for sealingly engaging the inner surface of the permeate tube at its distal end.

The means for preventing membrane telescoping at the proximal ends comprises a central ATD assembly, comprising:

(1) a flat, circular plate having a plurality of holes therethrough that fits closely within the pressure vessel, is perpendicular to the axis, and comprises a solid hub section, this hub section having a pair of recessed central areas, each facing one membrane module, and a plurality of axially protruding lugs within each central area that are concentrically disposed for engaging the proximal end of one permeate tube, and (2) an interconnector that is concentrically disposed and rigidly attached to the hub section on each side thereof, each interconnector having an o-ring recess near the end thereof for sealingly engaging the inner surface of each permeate tube at their proximal ends.

The flat, circular plate of each ATD contacts the spirally wound membrane of the membrane module at its ends and thereby prevents telescoping thereof. These membranes are available in the market. They are typically encased within a permeable mesh wrapping and have a length and a circumference sized to fit within the vessel. The membrane module typically extends to or is adjacent to the inner wall of the pressure vessel. The flat, circular plate of each ATD also fits closely within the inner wall of the pressure vessel and may abut the wall but preferably does not contact the pressure vessel in order to avoid scratching thereof.

DESCRIPTION OF THE PREFERRED EMBODIMENT

Figure 1:
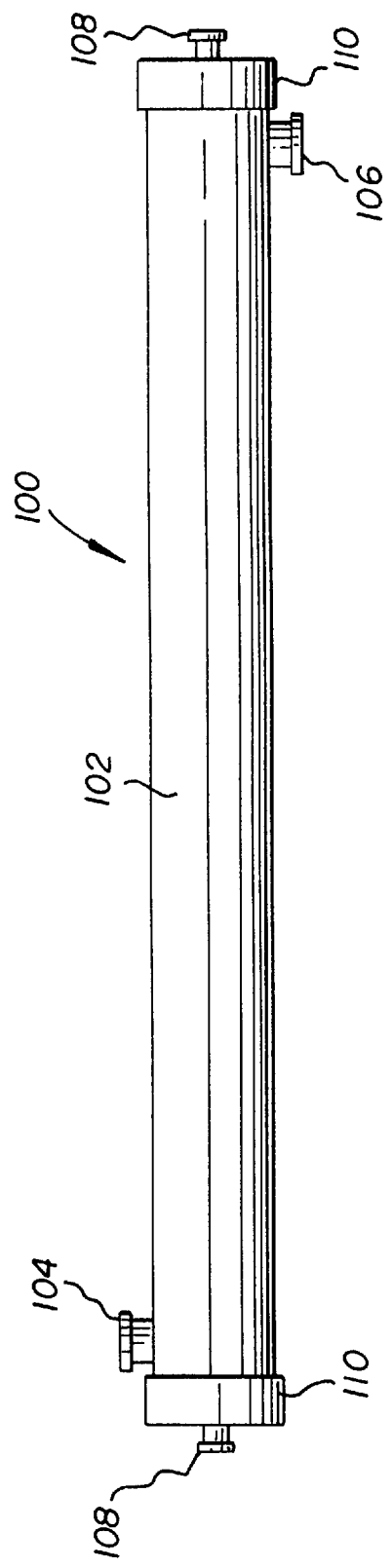
FIG. 1 is a side view of the pressure vessel having a pair of feed/concentrate inlet/outlet (I/O) support tubes and a pair of permeate outlet ports.

As shown in FIG. 1, elongated pressure vessel assembly 100 comprises a steel shell 102, a pair of end cap assemblies 110, a pair of inlet/outlet (I/O) ports 104, 106, and a pair of permeate outlet ports 108. Vessel assembly 100 is typically used for ultrafiltration of milk to increase the yield of casein, the whey protein, butterfat, and some minerals. It is also easy to clean and sterilize.

Figure 2:
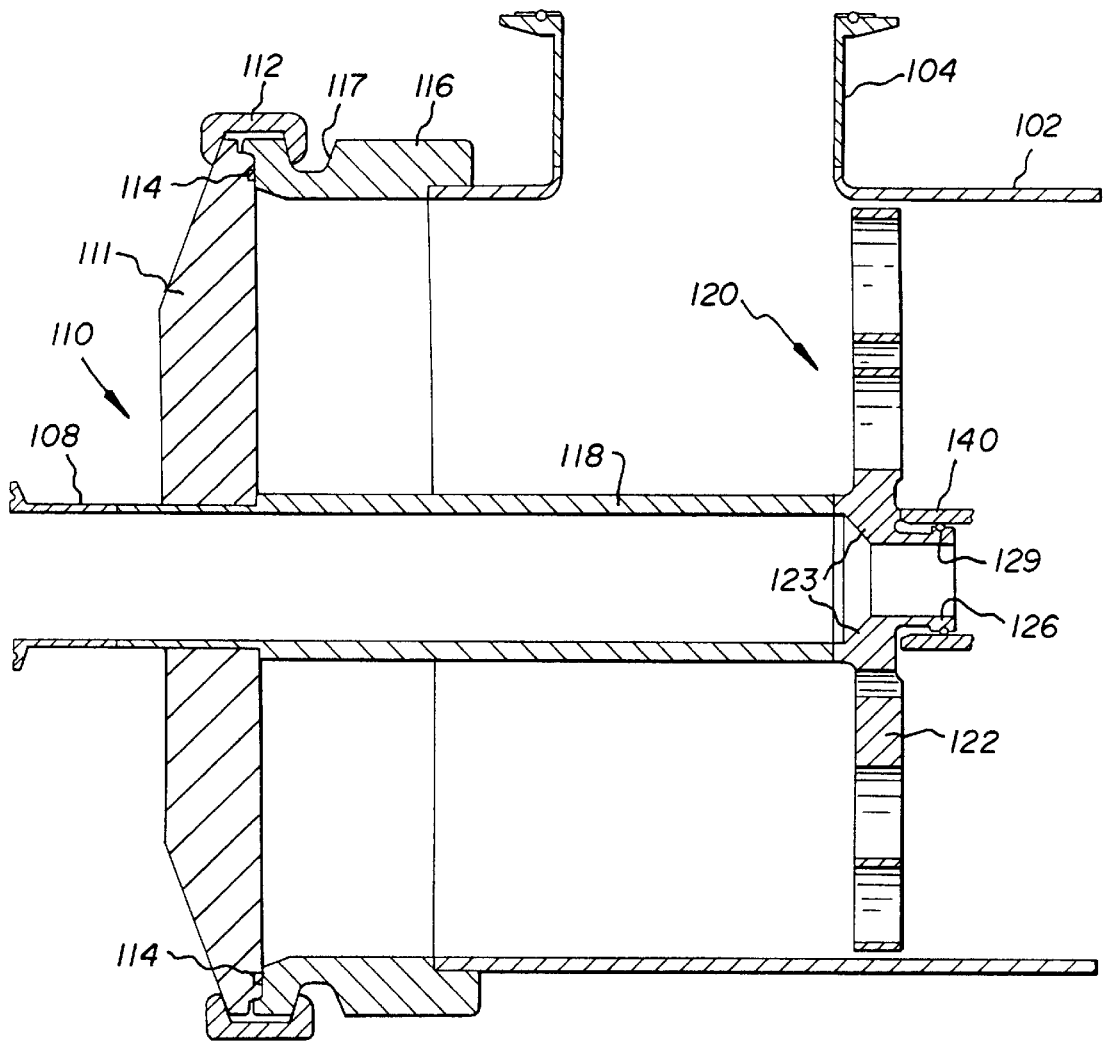
FIG. 2 is a sectional side view of one end of the pressure vessel, showing a permeate outlet port, an end cap, an I/O support tube, a permeate outlet support tube, and an ATD with its attached interconnector.
Figure 3:
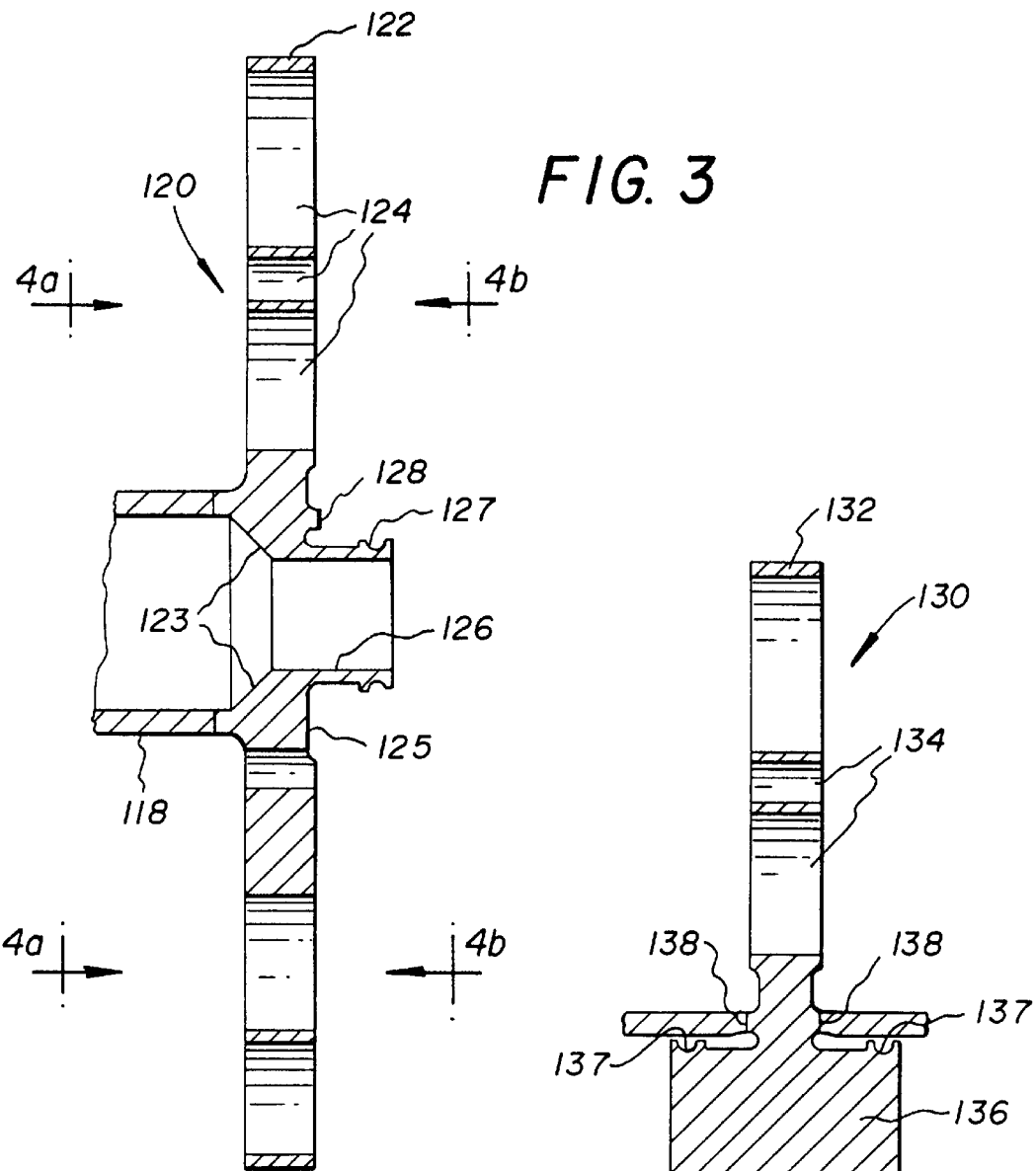
FIG. 3 is a sectional side view of an end-cap ATD.

As shown in FIGS. 1–3, end-cap assemblies 110 are rigidly attached to end-cap ATD assemblies 120. Each end-cap assembly 110 comprises a heavy steel end cap 111 that is rigidly attached perpendicularly to permeate outlet port 108 and to permeate outlet support tube 118. Outlet port 108 and tube 118 are in axial alignment. Port 108 is typically a standard 1½-inch butt welding ferrule and is ready for a clamp union with a standard gasket. A circular recess in the periphery of the inner side of each end cap 111 holds o-ring 114.

Each end of steel shell 102 is welded to an end ring 116 that comprises a circular recess 117, having inclined sides, near its outer end. Each end cap 111 is attached to an end ring 116 by a clamp 112 that consists of two equal halves bolted together with a bolt and nut on each end thereof. As these halves are drawn together, the ends of clamp 112 are urged deeper into recess 117, compressing o-ring 114 against the flat face of end ring 116 and thereby providing an effective seal for the contents of vessel 102.

A side I/O port 104, as shown in FIG. 2, in the form of a standard 3-inch butt welding ferrule, is welded to vessel shell 102 so that feed entering port 104 impinges directly upon permeate outlet support tube 118 and turns at 90° to pass through the adjacent ATD assembly 120 which is disposed perpendicularly to tube 118.

Figure 4A:
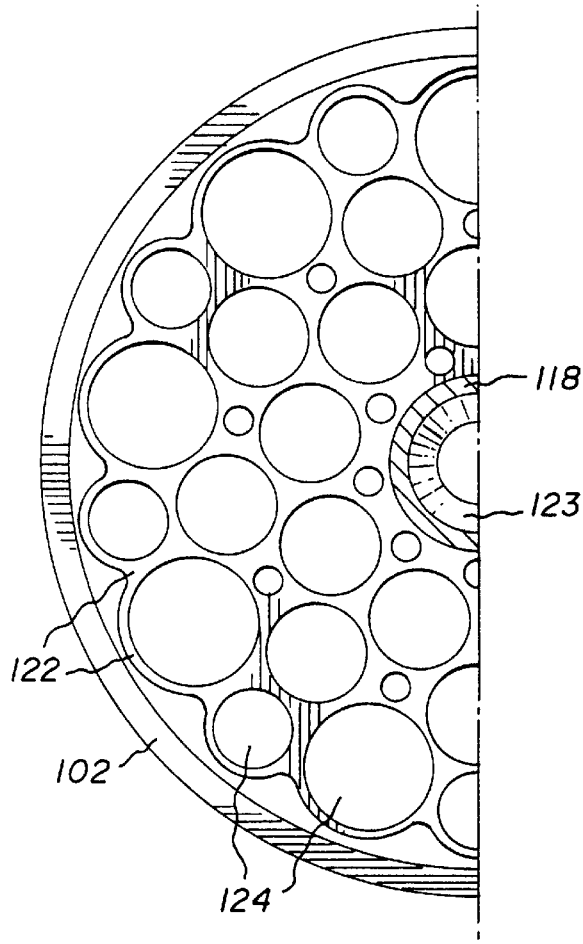
FIG. 4a is a partial front view, taken in the direction of the arrows 4a—4a in FIG. 3, that shows an end-cap ATD as it would be viewed after removal of the end cap.
Figure 4B:
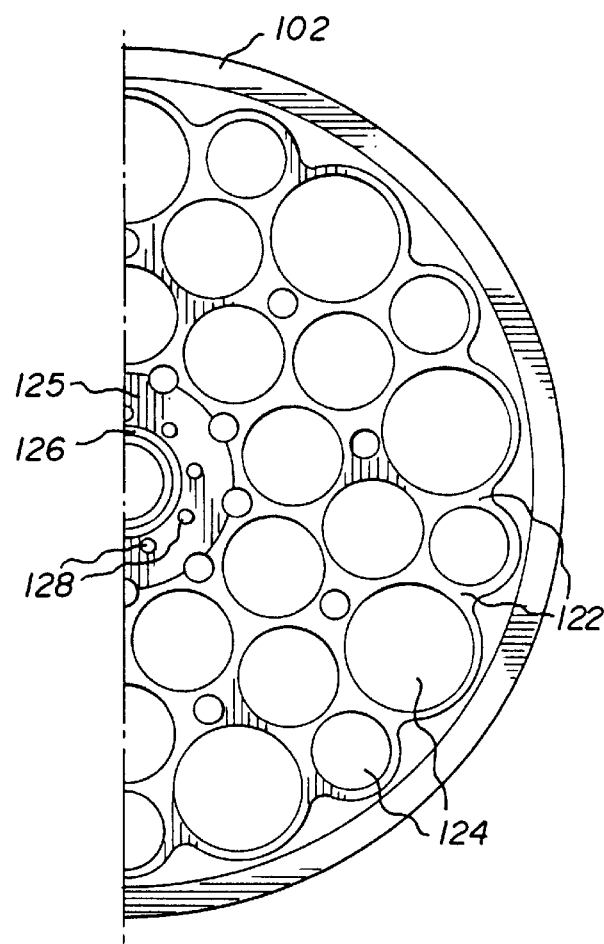
FIG. 4b is also a partial front view, taken in the direction of the arrows 4b—4b in FIG. 3, that shows the same end-cap ATD as it would be viewed from the permeate tube if axially separated therefrom.

As shown in FIGS. 4a and 4b, each ATD assembly 120 comprises ½-inch circular plate 122, hub section 123, recessed central area 125 which faces permeate tube 140, nine supporting lugs 128 in area 125, rigidly attached interconnector 126, o-ring recess 127 in the outer periphery of interconnector 126, and o-ring 129. Plate 122 is made of AISI 316L stainless steel, with a number of staggered holes 124 therein of several sizes to allow free passage of the liquid stream being processed by the membrane filtration system.

Lugs 128 bear the endwise thrust of permeate tube 140 and prevent any tendency thereof to increase its length by partial unwinding, i.e., to "telescope".

Figure 5:
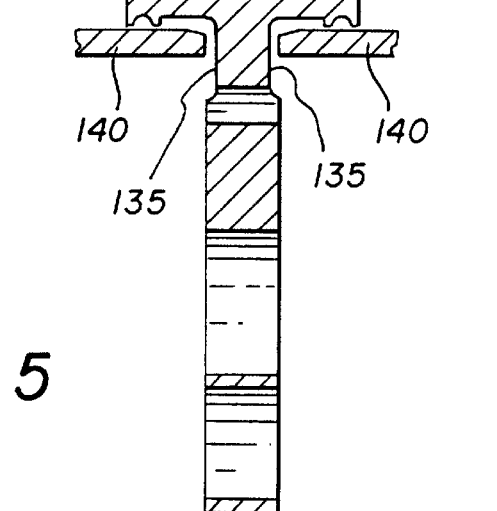
FIG. 5 is a sectional side view of the central ATD with both straddling permeate tubes in place but without the o-rings that would be inserted before operating the pressure vessel.

As shown in FIG. 5, central ATD assembly 130 comprises ½-inch circular plate 132, recessed central areas 135 on each side thereof, holes 134, nine protruding lugs 138 in each central area 135, massive interconnector 136 as its hub section, and a pair of recesses 137 for o-rings at the outer periphery of each of a pair of axially protruding portions at respective ends of interconnector 136. These protruding portions are disposed within the proximal ends of permeate tubes 140 when these ends are in contact with lugs 138. These o-rings, not shown in the drawings, engage the proximal ends of permeate tubes 140 on each side of plate 132 and isolate the concentrating feed stream from the permeate within tubes 140.

It is anticipated and expected that proteins from a wide variety of biological fluids, such as skim milk, whole milk, cheddar cheese whey, colostrum, colostral whey, whole blood, blood serum, tissue culture fluids, fermentation broths, and egg yolks and the like may be enriched and concentrated by employing the ultrafiltration apparatus and method of this invention.

Ultrafiltration units incorporating the improved architecture of the present invention are particularly suited for and can be used to advantage in the production of precheese. Typically, a series of units are used to provide the final concentration required to obtain retentate corresponding to the composition and concentration of precheese.

This precheese and a coagulant may then be mixed using the mixing method and mixing device described in my copending patent application Ser. No. 08/694,229, filed on Aug. 8, 1996, and entitled APPARATUS FOR MIXING FLUIDS AND METHOD OF USE IN PRECHEESE FORMATION, now U.S. Pat. No. 5,688,542, the teaching of which is incorporated herein by reference thereto. Described therein is an in-line mixer which is used to mix a coagulant, such as rennet and retentate from ultrafiltration. Mixing is effected in a short time.

The mix of precheese and coagulant prepared using the aforesaid mixing method can be treated to form a ribbon of cheese in accordance with the continuous cheese coagulation method described in my copending patent application Ser. No. 08/694,228, filed on Aug. 8, 1996, and entitled CONTINUOUS CHEESE COAGULATION METHOD, now U.S. Pat. No. 5,753,282 the teaching of which is incorporated herein by reference thereto.

It is not intended to limit the apparatus of the present invention to the particular embodiment described herein, and various modifications may be made, including, but not limited to, changes in dimensions, shape and materials, without departing from the scope and spirit of the invention as set forth in the following claims.

What is claimed is:

1. In a pressure vessel for ultrafiltration of fluids that contains a concentrically disposed filtration membrane module, the improvement comprising a pair of anti-telescoping devices (ATD's) that are disposed within said pressure vessel and near each end thereof for preventing an increase in length, of said module, said devices comprising:
    (a) an end cap assembly, comprising:
        (1) an end cap, having an outer face and a circular inner recess for an o-ring, that is disposed perpendicularly to said axis and is rigidly and removably attached to one said open end,
        (2) a permeate outlet support tube, having a proximal end and a distal end, that is axially and rigidly attached to said end cap,
        (3) an end ring that is rigidly attached to an end of said pressure vessel and has a peripherally disposed circular outer recess and an outwardly facing and radially disposed flat surface,
        (4) a clamp that forcefully connects said end cap to said end ring by engaging said outer face and said inner recess, and
        (5) an o-ring, within said inner recess, that sealingly engages said flat surface, thereby sealing said one end of said vessel; and
    (b) an ATD assembly, comprising:
        (1) a flat, circular plate, having a plurality of holes therethrough, that fits closely within said pressure vessel, is perpendicularly disposed to said axis, and comprises
            a hub section surrounding a central hole, said hub section being rigidly attached to said permeate outlet support tube and having a recessed central area facing said membrane module, a plurality of axially protruding lugs within said central area that are concentrically disposed for engaging the distal end of one said membrane module, and
        (2) an interconnector that is concentrically disposed and rigidly attached to said hub section, said interconnector having an o-ring recess near an end thereof for sealingly engaging the inner surface of said permeate tube at said distal end thereof.

2. In said pressure vessel of claim 1, wherein a pair of said membranes are disposed in axial alignment, the improvement further comprising a central anti-telescoping device for separating said membrane modules and for providing resistance to longitudinal expansion thereof, comprising
    a flat, circular plate, having a plurality of holes therethrough, that fits closely within said pressure vessel, is perpendicular to said axis, and comprises a massive interconnector as the hub section thereof, said interconnector having a pair of recessed central areas, each facing one said membrane module, a plurality of protruding lugs within each said central area that are concentrically disposed for engaging the proximal end of one said permeate tube, a pair of axially protruding portions that are disposed within said proximal ends of said permeate tubes when these ends are in contact with said lugs, and an o-ring recess near the outer periphery of each said protruding portion for sealingly engaging the inner surface of each said permeate tube, said massive interconnector being solid, thereby preventing the mixing of permeate from one of said membrane elements with permeate from the other of said membrane elements.

3. An anti-telescoping device assembly for installation within a pressure vessel used for ultrafiltration of fluids and for prevention of telescoping of a membrane module having a permeate tube wrapped with a spirally wound membrane, comprising:
    (a) a flat, circular plate having a plurality of holes therethrough that fits closely within said pressure vessel, is perpendicular to said axis, and comprises:
        (1) a hub section surrounding a central hole, said hub section being rigidly attached to a permeate outlet support tube and having a central area facing said membrane, and
        (2) a plurality of axially protruding lugs within said central area that are concentrically disposed for engaging one said distal end of said permeate tube, and
    (b) an interconnector that is concentrically disposed and rigidly attached to said hub section, said interconnector having an o-ring recess near an end thereof for sealingly engaging the inner surface of said permeate tube.

4. A central anti-telescoping device (ATD) assembly for installation within the mid-section of a pressure vessel used for ultrafiltration of fluids and for prevention of telescoping of a pair of axially aligned membrane modules at the proximal ends thereof, each having a permeate tube wrapped with a spirally wound membrane, said central ATD assembly comprising:
    (a) a flat, circular plate having a plurality of holes therethrough that fits closely within said pressure vessel, is perpendicular to said axis, and comprises a solid hub section, said hub section having a pair of central areas, each facing one said membrane, and a plurality of axially protruding lugs within each said central area that are concentrically disposed for engaging said proximal end of one said permeate tube, and
    (b) an interconnector that is concentrically disposed and rigidly attached to said hub section on each side thereof, each said interconnector having an o-ring recess near an end thereof for sealingly engaging the inner surface of each said permeate tube.

5. An ultrafiltration unit comprising:
(a) an elongated tubular vessel having a first open end, a second open end, and a longitudinal axis;
(b) means for closing said first and second open ends to form closed first and second ends, comprising:
    (1) an end cap, having an outer face and a circular inner recess for an O-ring, that is disposed perpendicularly to said axis and is rigidly and removably attached to one said open end,
    (2) a permeate outlet support tube that is axially and rigidly attached to said end cap,
    (3) an end ring that is rigidly attached to an end of said pressure vessel and has a peripherally disposed circular outer recess and an outwardly facing and radially disposed flat surface, (4) a clamp that forcefully connects said end cap to said end ring by engaging said outer face and said inner recess, and (5) an O-ring, within said circular inner recess, that sealingly engages said flat surface, thereby sealing said one open end of said vessel;

(c) two spirally wound membrane modules that are encased in said vessel, disposed in axial alignment, and have proximate and distal ends, said proximal ends of said membranes facing one another and said distal ends being separated from one another, each said module comprising a permeate tube, having a proximal end and a distal end, and a spiral membrane surrounding said permeate tube;

(d) means for preventing membrane telescoping at said distal ends of each of said membrane modules:

(e) means for separating said proximal ends of each of said membranes from one another and preventing membrane telescoping at said proximal ends, comprising an ATD assembly that comprises:

(1) a flat, circular plate having a plurality of holes therethrough that fits closely within said pressure vessel, is perpendicular to said axis, and comprises recessed central areas on each side thereof, (2) a plurality of protruding lugs in each said central area that are concentrically disposed for engaging said proximal end of one said permeate tube, and (3) a massive interconnector that is concentrically disposed and rigidly attached to said flat circular plate as the hub section thereof, said interconnector having a pair of axially protruding portions that are each disposed within the proximal end of one said permeate tube when said end is in contact with said lugs, and a concentric O-ring recess near the outer periphery of each said protruding portion for sealingly engaging the inner surface of said permeate tube.

6. An ultrafiltration unit, comprising:

(a) an elongated tubular vessel having a first open end, a second open end, and a longitudinal axis;

(b) means for closing said first and second open ends to form closed first and second ends;

(c) two spirally wound membrane modules encased in said vessel and disposed in axial alignment, said modules having proximal and distal ends and comprising a permeate tube, having a proximal and a distal end, that is surrounded with a spiral membrane, said proximal ends of said membranes facing one another, and said distal ends being separated from one another;

(d) means for preventing membrane telescoping at said distal ends of each of said membrane modules;

(e) a pair of axially protruding portions that are disposed within said proximal ends of said permeate tubes when these ends are in contact with said lugs;

(f) means for separating said proximal ends of each of said membranes from one another and preventing membrane telescoping at said proximal ends, comprising a central ATD assembly that comprises a flat, circular plate having a plurality of holes therethrough that fits closely within said pressure vessel, is perpendicular to said axis, and comprises a massive interconnector as the solid hub section thereof, said interconnector having a pair of central areas, each facing one said membrane, a plurality of protruding lugs within each said central area that are concentrically disposed for engaging said proximal end of one said permeate tube, and a pair of axially protruding portions that are disposed within said distal ends of said permeate tubes as said ends contact said lugs, each said protruding portion having an O-ring recess near the outer periphery thereof for sealingly engaging the inner surface of each said permeate tube;

(g) means for removing permeate from the distal end of each of said permeate tubes and out of said ultrafiltration unit;

(h) inlet means at or proximate the closed first end for introducing fluid to be treated in the ultrafiltration unit; and (i) outlet means at or proximate the closed second end for removing retentate from the ultrafiltration unit.

7. The ultrafiltration unit of claim 6, wherein said pair of central areas is recessed.

* * * * *